United States Patent [19]

Haldimann

[11] 4,200,421
[45] Apr. 29, 1980

[54] APPARATUS FOR MOVING ARTICLES IN A SHELF STORAGE UNIT

[75] Inventor: Hans R. Haldimann, Zurich, Switzerland

[73] Assignee: Weelpal A.G., Zug, Switzerland

[21] Appl. No.: 693,505

[22] Filed: Jun. 7, 1976

[30] Foreign Application Priority Data

Jun. 6, 1975 [AT] Austria ............................... 4341/75
Nov. 26, 1975 [CH] Switzerland ...................... 15427/75

[51] Int. Cl.² .............................................. B65G 1/06
[52] U.S. Cl. .................................... 414/280; 414/241; 414/267; 414/252
[58] Field of Search ............... 214/16.4 A, 16.4 R, 214/16.4 B, 16.4 C; 414/222, 273, 249, 267, 269, 273–287, 241, 252

[56] References Cited

U.S. PATENT DOCUMENTS

| | | | |
|---|---|---|---|
| 3,240,365 | 3/1966 | King | 214/16.4 A |
| 3,507,406 | 4/1970 | Zollinger | 214/16.4 A |
| 3,837,511 | 9/1974 | Howlett | 214/16.4 C |
| 3,921,828 | 11/1975 | Suizo | 214/16.4 C |

FOREIGN PATENT DOCUMENTS

786661 6/1968 Canada ............................... 214/16.4 R

*Primary Examiner*—Stephen G. Kinin
*Assistant Examiner*—R. B. Johnson
*Attorney, Agent, or Firm*—Gajarsa, Liss & Conroy

[57] ABSTRACT

The present invention provides a continuous shelf storage unit comprising a shelf, an inclined rail track on which non-driven wheeled carriages can move, with auxiliary equipment for the loading and unloading of the shelf, the rail track having a slight incline for causing a deceleration of wheeled carriages coasting thereon, and momentum-imparting apparatus acting on the wheeled carriages and disposed in the track. The momentum imparting apparatus is activated by the auxiliary devices during removal of a carriage from the shelf.

8 Claims, 11 Drawing Figures

APPARATUS FOR MOVING ARTICLES IN A SHELF STORAGE UNIT

The present invention relates to a continuous shelf-storage unit.

Continuous shelf storage units are known in which goods to be stored are placed in mobile storage and transporting units on shelves fitted with rails, and where a mobile conveyance, as well as a receiving device for unloading the shelves are present at the removal end of the shelf (e.g. Swiss Pat. No. 557,796). In such units simple carriages running on tracks and coasting down an incline, have been successfully used to convey goods. In such a case the gradient must be such as to ensure automatic starting of the carriages regardless of whether they are heavily or lightly laden, or even completely empty. An incline of sufficient steepness, however, also produces acceleration of the carriages to an excessive speed, so that the latter have to be repeatedly braked. For this purpose braking equipment has been introduced into the tracks. A requirement of such a braking device is that the braking, i.e., the deceleration produced by the device, must be as independent as possible of the state of loading and hence of the weight of the carriages.

A great variety of braking devices have been suggested, which have more or less satisfied the requirements set for them (e.g. Swiss Pat. Nos. 573,832, 557,252, 561,619 and 568,874). A disadvantage in every case, however, has been that a considerable number of such braking devices is needed and in the case of large continuous shelf storage units this can entail considerable costs. The purpose of the invention is to enable the use of braking devices to be dispensed with. This is achieved by providing a track for the wheeled carriages which is only slightly inclined, preventing automatic start-up, but one which will slow a coasting carriage only moderately, while every time a carriage is removed from the unit, some momentum is imparted to each carriage on the track.

The momenta imparted are sufficient to move the individual carriages a few carriage lengths, after which a coasting carriage will slowly come to a stop, owing to rolling friction, without the necessity of any additional braking equipment. It is important to keep the incline so gentle that there can be no automatic starting up of either loaded or unloaded carriages.

A very gentle gradient also serves to counteract the slopes that result from the deflection of the track between two rail supports caused by the transport load. In all cases, however, the rolling friction of the wheels of the carriage is greater than the acceleration caused by the incline of the track, so that the carriages which have been set in motion by the momenta imparted will gradually slow down and stop.

Thus in accordance with the invention, there is provided a continuous shelf storage unit comprising a shelf, an inclined rail track on which non-driven wheeled carriages can move, with auxiliary equipment for the loading and unloading of the shelf, the rail track having a slight incline for causing a deceleration of wheeled carriages coasting thereon, and momentum-imparting means acting on the wheeled carriages and disposed in the track, which means are activated by the auxiliary devices during removal of a carriage from the shelf.

Expediently, the momentum imparting device comprises a push rod mounted in the center of the track in such a way that it can move in the longitudinal direction and which is provided with entrainment means. A draw spring can also be provided which is secured at one end to the push rod and at the other end, towards the unloading end of the shelf, is secured to the shelf, in order to keep the push rod in a displaced position relative to the end of the shelf when in a state of rest. Simultaneously, the spring serves as a device for storing the momentum which is imparted to the carriages.

The entrainment means are secured to the push rod in such a way that they can be rotated from an operating position where they project into the path of the carriages into a resting position where they lie outside this path.

In one embodiment of the invention, each entrainment device comprises an eccentrically mounted, two-armed lever, the longer arm of which is supported against the push rod while the shorter arm extends into the path of the carriage.

One requirement of such entrainment means is that when the push rod is motionless they can be passed over by a coasting carriage. This requirement is met by having the entrainment devices rotatable from an operating position in which they extend into the path of motion of the carriage into a rest position in which they are recessed into the push rod, and at the same time means are provided to ensure that the entrainment devices return automatically to their operating positions. The latter is brought about by gravity, the entrainment means being in the form of two-armed eccentrically and rotatably mounted levers.

In test carried out by the applicant with such a design, the following problem arose: although theoretically all the carriages on a shelf are given the same momentum, in practice it is found that considerable differences of speed arise among the individual carriages after they have been set in motion by the momentum imparting means. This may be due to the different weights of the individual carriages or to the slope of the track being not uniform over its entire length. In any event it would be desirable for the speeds of the moving carriages to be similar, and if possible, for this to be achieved without recourse to an expensive control device.

In a further development of the invention speed equilization can be achieved very simply without the necessity of additional energy consumption. According to this development, the entrainment means comprise levers mounted rotatably on the push rod on one side, which levers are acted upon by elastically yielding restoring means of low natural frequency and high self damping, which restoring means tend to force the levers into an operating position extending into the path of the wheeled carriages. At its free end each lever possesses a slide face at an angle of 90° or more to the lever.

The invention is further described below by way of example with reference to the accompanying drawings, wherein.

Figure 1:
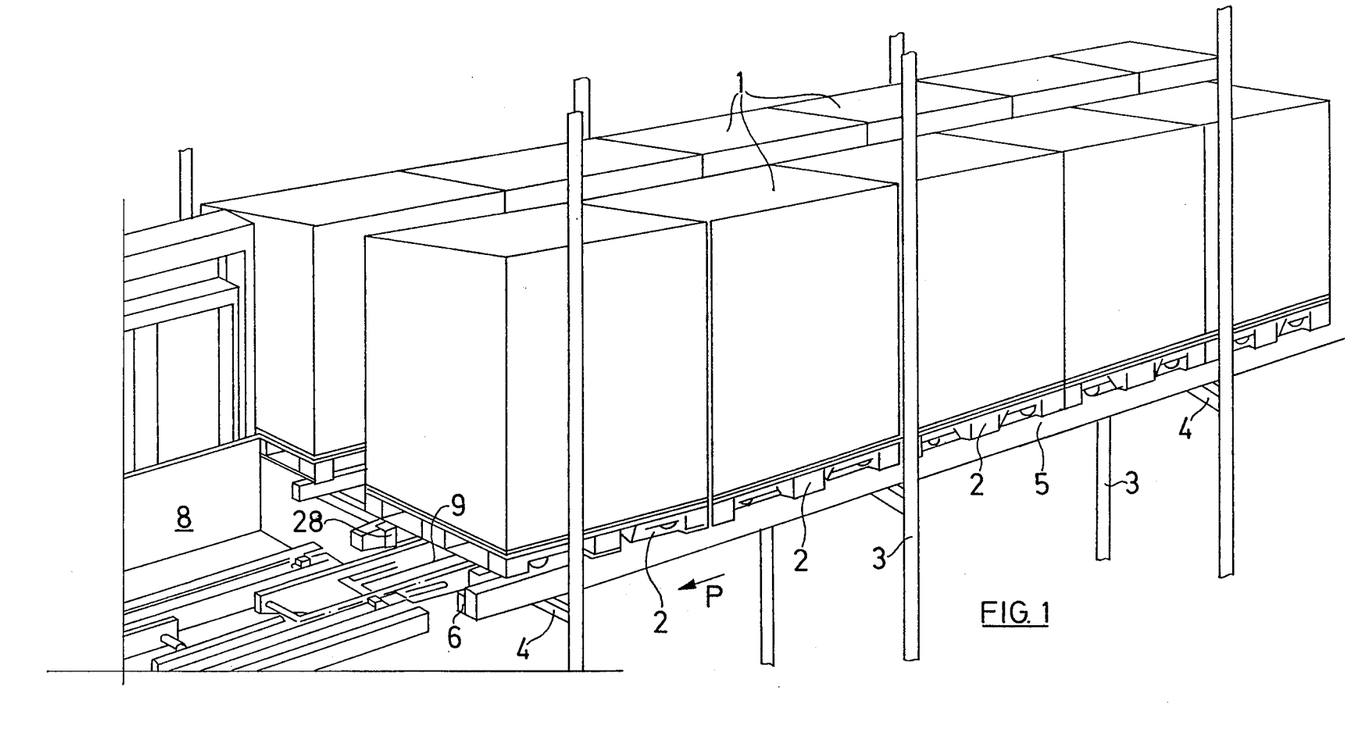
FIG. 1 is a partial view of a continuous shelf storage unit represented diagramatically as a general perspective.

The continuous shelf storage unit possesses a storage framework intended for the accommodation of storage and transpost units in the form of wheeled carriages 2 loaded with goods 1. The framework consists essentially of a number of vertical supports 3 joined together by horizontal cross members 4. Resting on the cross members 4 are longitudinal beams 5, each of which bears a rail 6 which is slightly inclined relative to the horizontal in the direction of arrow P, i.e., in the direction of the unloading end of the shelf compartment thus formed. At the end of the rail 6 a safety means 28 is installed which prevents the storage and transport units 2 from unintentionally running past the end of the rails.

The slope of the rails 6 is chosen so that the storage and transport units will not under any circumstances begin moving automatically. Storage and transport units 2 which find themselves in motion are moderately slowed in their motion because the acceleration produced by the slight incline of the rail is less than the deceleration force produced by the rolling friction of the wheels. Under the weight of the loaded storage and transport units 2 the rails 6 undergo a deformation inasmuch as they are deflected somewhat between two neighbouring cross members 4, so that the rolling of the wheels is at first accelerated slightly on the slope and is then slowed again somewhat on the ascending part. It will suffice if the overall inclination of the rails 6 is chosen so that the coasting wheels will not be completely stopped by the described deformation of the rails.

At the front or unloading end of the shelf there is a mobile conveyance 8 fitted with an unloading device 9.

Between the two rails 6, which form a track, a momentum imparting means is provided which acts on the transport and storage units 2 whenever a transport and storage unit is unloaded by the conveyance 8.

The detailed design of the momentum imparting means is evident from FIGS. 2–6. The momentum imparting means is in the form of a push rod 10 and is disposed between the rails 6. As is seen best in FIG. 6, the push rod has an upper section 11 with a U-cross section and a lower part 12 in the form of a double guide which has a contact face 13. Along the rails 6 bearing brackets 14 are mounted on cross beams 4. Each of these bearing brackets accommodates a roller 15 against which a contact face 13 of the push rod is supported. In this way the push rod is supported on rollers 15 so that it can move on the rails 6, the double guide 12 embracing a flange 14'. The movement along the rails is possible only against the action of a spring 16 which tends to keep push rod 10 in one terminal position. In order to displace the push rod 10 there is an actuating rod 17 which is in contact at one end with the push rod 18 and at the other end, at 19, with a hinged lever 20. The latter is rotatably mounted at 21. A lever 22 connects the hinged lever 20 with a tripping device 23. The latter is disposed at the front, unloading end of the storage shelf in such a way that when the unloading device 9 comes into position, the tripping device 23 is rotated in the direction of the arrow, so that through the action of the lever 22 and the hinged lever 20 the actuating rod 17 is displaced as a result the push rod 10 is also made to slide on rollers 15 against the action of a spring 16, thereby stressing the spring 16.

The push rod 10 is fitted with entrainment means in the form of pawls 24 which are rotatably mounted about an axis 25 in the U-shaped upper part 11 at equal intervals. The pawls 24 normally take the position shown in the right hand side of FIG. 5, in which their faces 24' come to rest against the floor 11' of the U-shaped upper section 11, while their faces 24" are vertical and act as contact faces with a traverse 26 of a storage and transport unit 2. It is clear from FIG. 5 that the pawls can be passed only from left to right, not from right to left. When the storage and transport units run over the pawls 24, the pawls are rotated clockwise into the position shown at the left side of FIG. 5. In this position the pawls 24 come to rest against stop pins 27.

Figure 4:
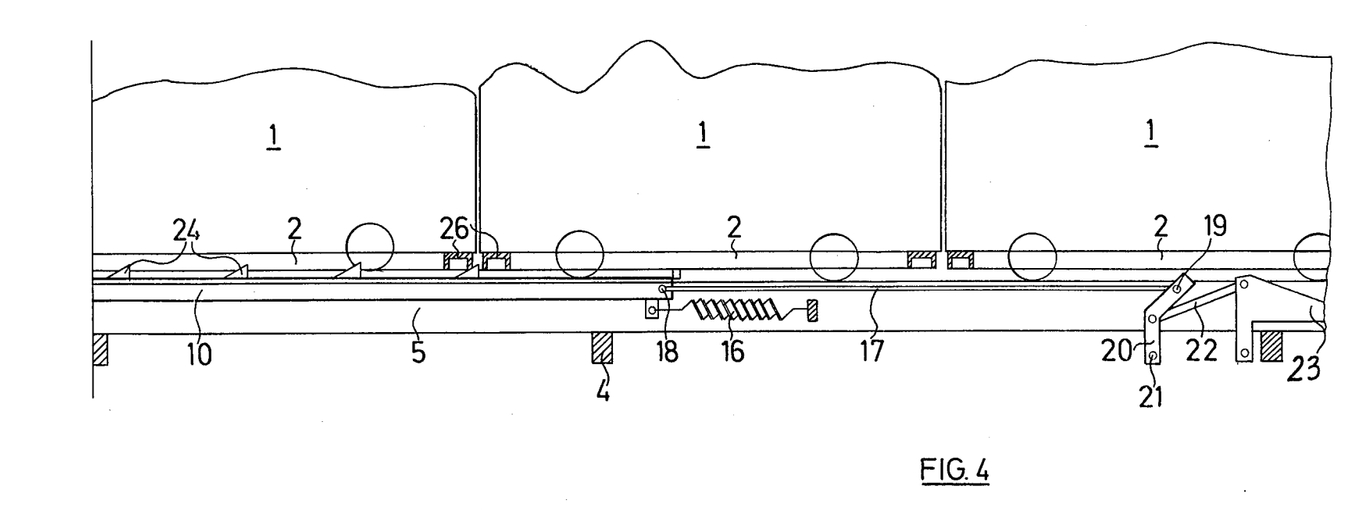
FIG. 4 is a diagram of the momentum imparting means.
Figure 5:
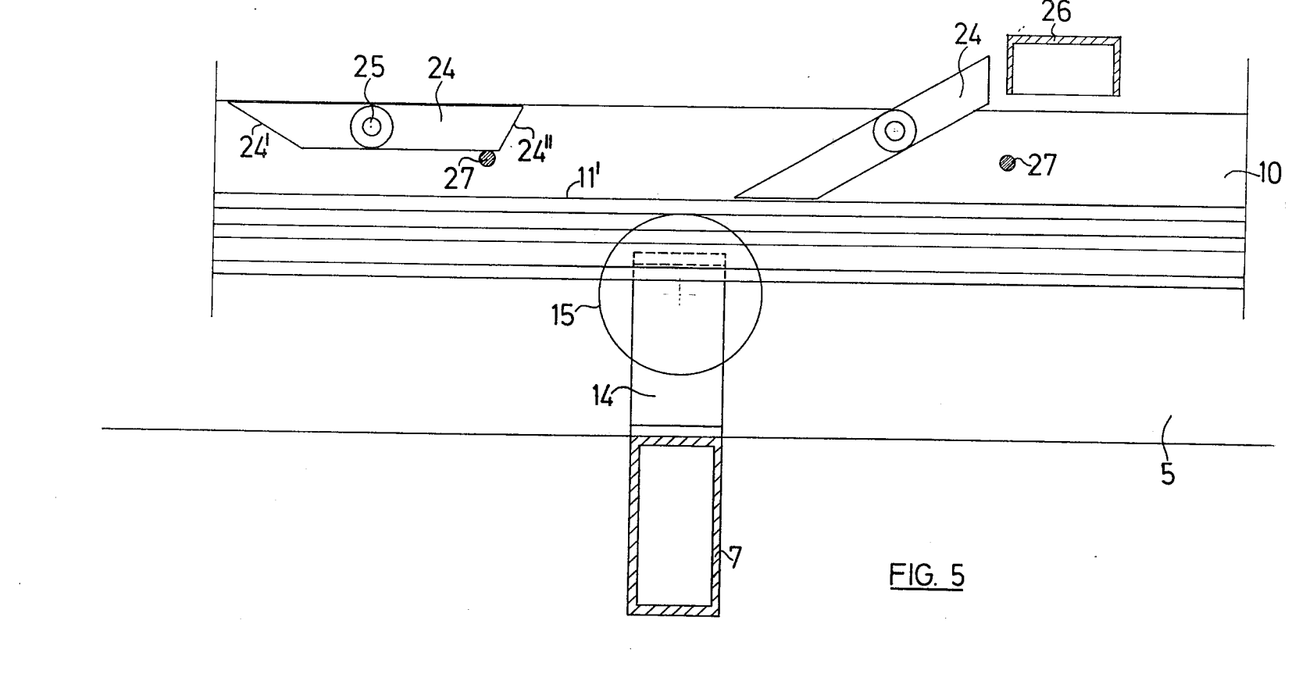
FIG. 5 is a side view showing a momentum imparting device.
Figure 6:
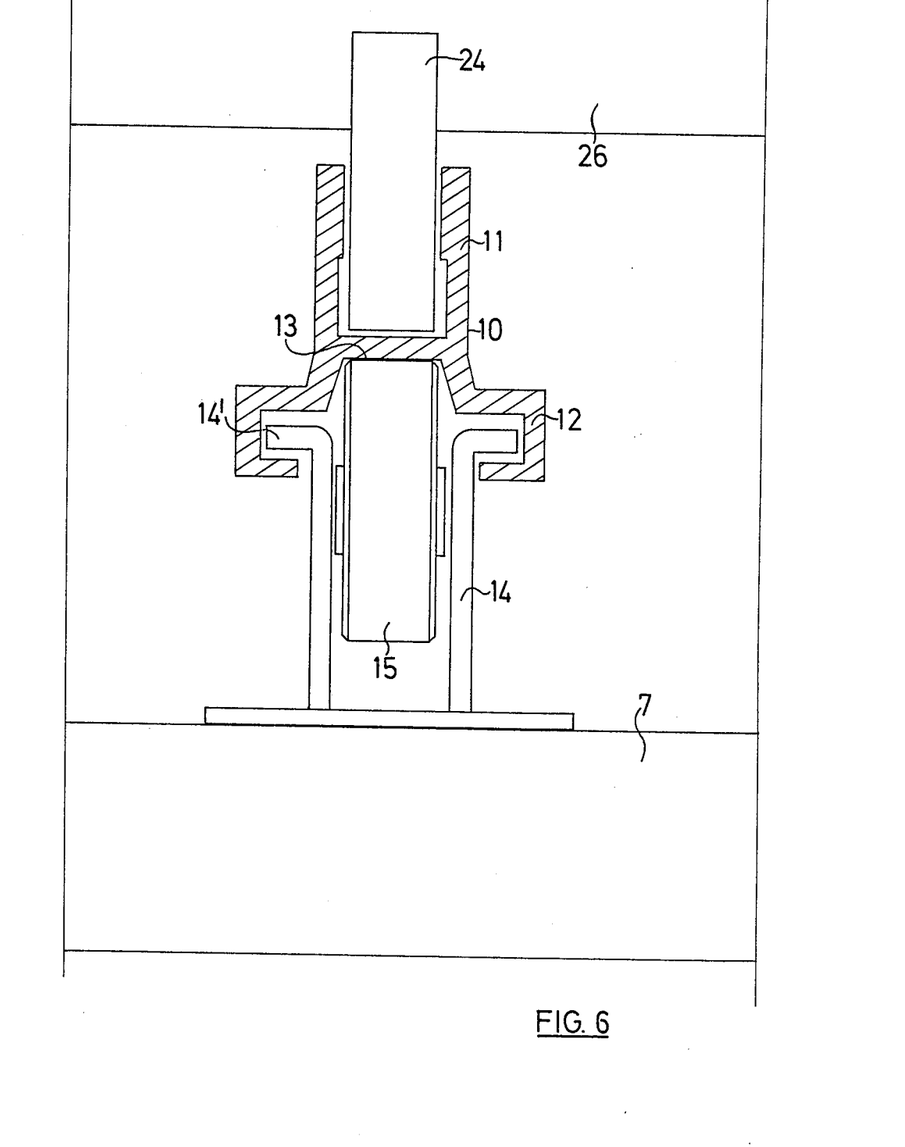
FIG. 6 is a cross-section of the momentum imparting device of FIG. 5.

From FIG. 4 the general arrangement of the push rod 10 fitted with the pawls 24 is evident in relation to cross members 4 and the storage and transport units 2, with the spring 16 relaxed. When the unloading device 9 comes into position to unload the foremost storage and transport unit, the tripping device 23 is rotated counterclockwise and the operating rod 17 is moved from right to left so that spring 16 is stressed and the push rod 10 is also moved to the left. The latter slides under the storage and transport units 2 and in its end position again engages with the pawls 24 behind traverses 26 situated above. When the unloading device 9 has moved away, the spring 16 returns to its relaxed position, and in doing so moves the push rod 10, whereby the pawls 24 impart a momentum to traverses 26. This momentum has the effect of a gentle push and starts the storage and transport units 2 rolling, and as a result these continue to move from left to right at least by a distance equal to the length of one transport unit. The foremost storage and transport unit moves to the unloading position and can be unloaded and taken away by the newly arriving unloading device 9. If, on occasion, the momentum imparted should not suffice to move the storage and transport unit, a second or third momentum can be transmitted by the unloading device 9 or by supplementary operation by hand.

A modified design of a momentum imparting means is shown in FIGS. 2, 3 and 7–11.

Figure 2:
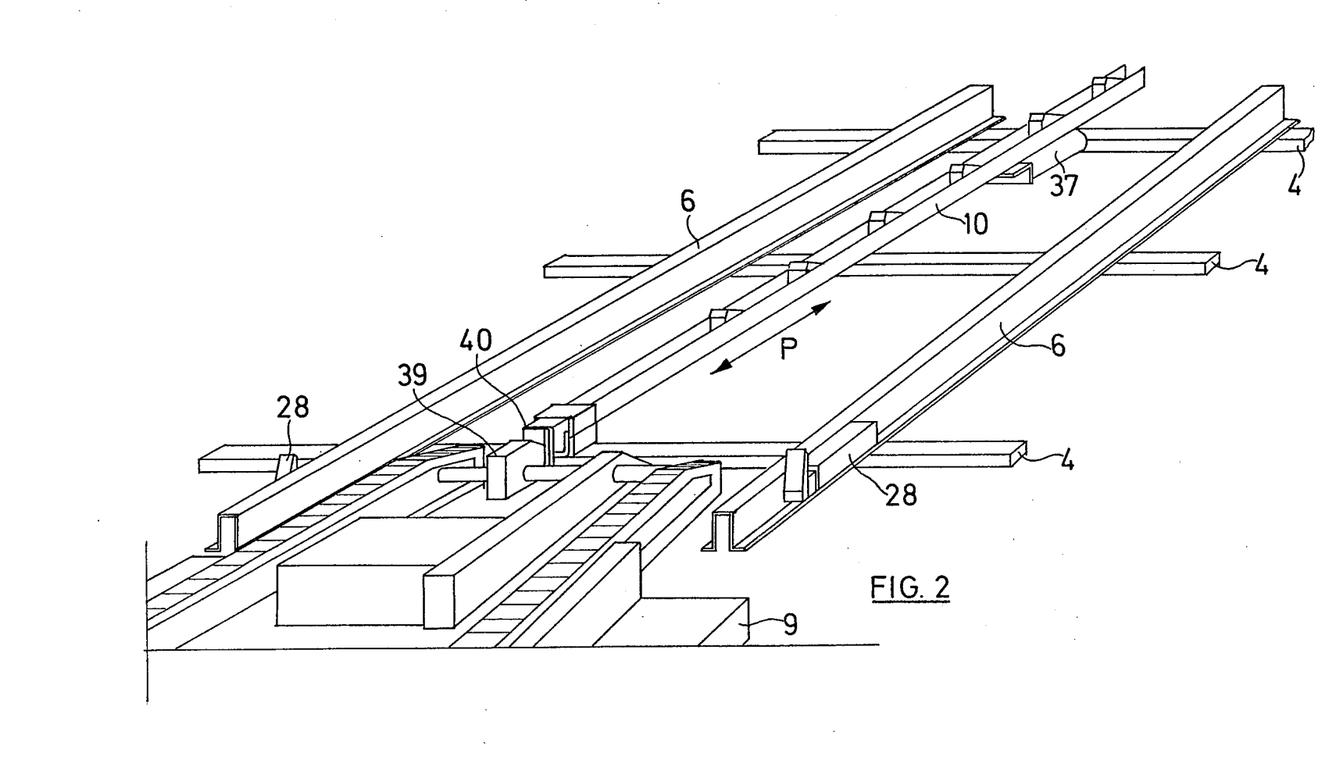
FIG. 2 is a section of a shelf compartment of a continuous shelf storage unit with unloading equipment in position.
Figure 3:
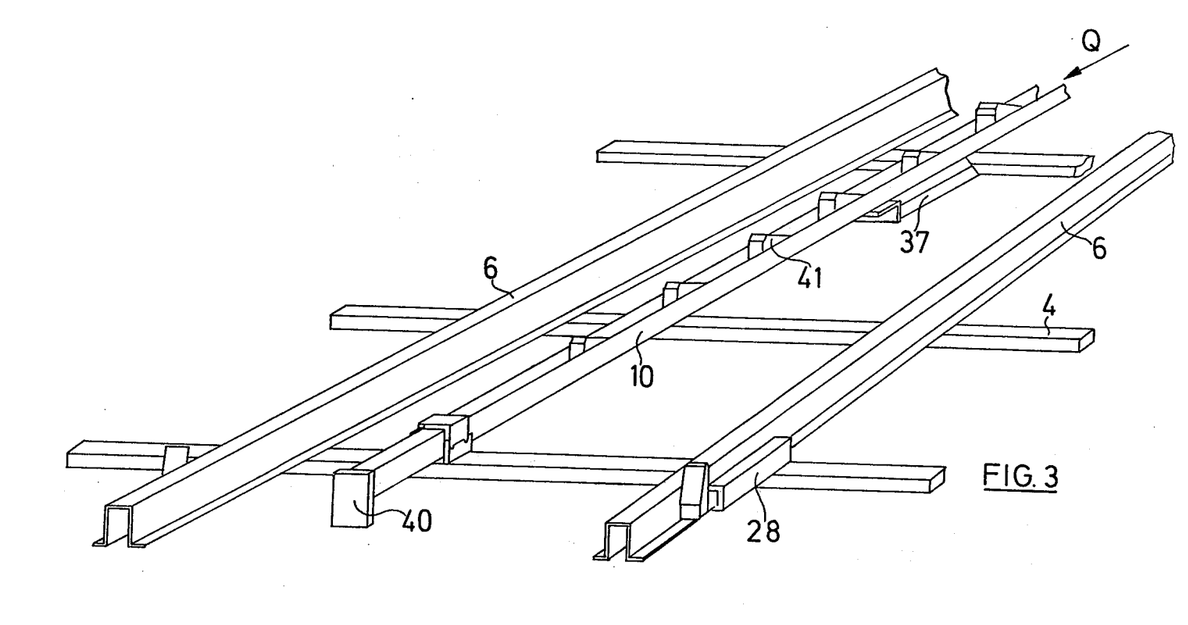
FIG. 3 is the same as FIG. 2 without the unloading equipment.

FIGS. 2 and 3 show the unloading end of shelf compartment. The rails 6 continue in the direction of the input side, the total length of a shelf compartment being up to 20 m. At the end of the track thus formed, stops 28 are provided, which prevent the wheeled carriages from running past the end of the shelf compartment.

The push rod 10 is mounted between the rails 6 and can move in the direction of arrow P. The bearing of the push rod may be designed in the same way as described in connection with FIG. 6. It is acted upon by a spring 37 which tends to force the push rod towards the unloading end. In FIG. 2 the unloading apparatus 9, which unloads the end wheeled carriage from the shelf compartment is also shown schematically. When this unloading device is moved into position in front of the shelf compartment it presses with a striker 39 against an end face 40 of push rod 10 and forces the latter against the action of a spring 37 in the direction towards the input side of the shelf compartment. In FIG. 3 the unloading device 9 is no longer in front of the shelf compartment, so that no force is exerted against the face plate 40. The push rod 10 is moved by spring 37 in the direction of arrow Q.

The push rod 10 is fitted with a multiplicity of entrainment means 41, the design of which is evident from FIG. 7 to 11. In the embodiment shown, a U-profile has been used for the push rod 10, which is open above, while the entrainment means 41 are secured inside the U. The latter are single-armed levers 42, which are rotatably mounted at one end on the push rod 10 by means of a pin 43. The other end of the lever 42 has a contact face 44 which is at an angle of approximately 90°–100° downward relative to lever 42. Also cooperating with the push rod 10 is a stop 45 against which an angled extension 46 secured to the free end of the contact face 44 comes to rest. The upward motion of the entrainment means 41 is limited by stop 45. The downward motion of the entrainment means 41 is limited by extension 46 coming to rest against the floor 10' of the U-shaped push rod 10.

A restoring device 47 is inserted beneath the lever 42. In the embodiment shown this consists of a hollow cylindrical body of butyl rubber, one side of which is in contact with the lever 42 while the other side is in contact with the floor part 10' of the push rod 10. The restoring device 47 thus tends to keep the entrainment means 41 in its operating position shown in FIG. 7, where it projects over the top of push rod 10. The fully retracted position of entrainment means 41 is seen in FIG. 9, which also shows clearly how restoring device 47 is elastically deformed.

It is essential that the material from which restoring device 47 is made should have a low natural frequency and high self damping. In tests carried out by the applicatnt it was found that butyl rubber can meet these requirements very well. Obviously, however, other materials can be used.

The modified design operates as follows:

It is assumed that the unloading apparatus 9 shown schematically in FIGS. 1 and 2 has just left its place, so that push rod 10 moves under the action of spring 37 in the direction of arrow Q in FIG. 3 towards the unloading end of the shelf. Each wheeled carriage 2, riding on the rails 6, is thereby given a momentum by entrainment means 41, so that all carriages begin to move towards the unloading end of the shelf. Because of their inertia the wheeled carriages 2 continue to move after the stroke of push rod 10 has been completed, and in doing so each carriage travels over one or more entrainment means 41. The latter are forced downwards by the carriages coasting over them, but immediately rotate up again as soon as the carriage has passed.

In FIGS. 7–11 the position of an entrainment means 41 is represented in different phases of its motion, when it is being passed over by a carriage 2 and is thus forced downwards by the traverse 51 of the latter. The carriage 2, here, is moving in the direction of the arrow shown inside the traverse. The different phases of the motion of the entrainment means are described below.

Figure 7:
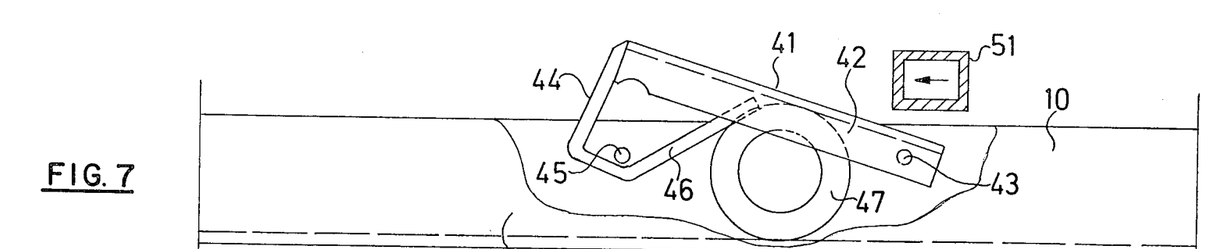
FIGS. 7–11 are partial sections through the push rod with different entrainment means in various positions.
Figures 8, 9:
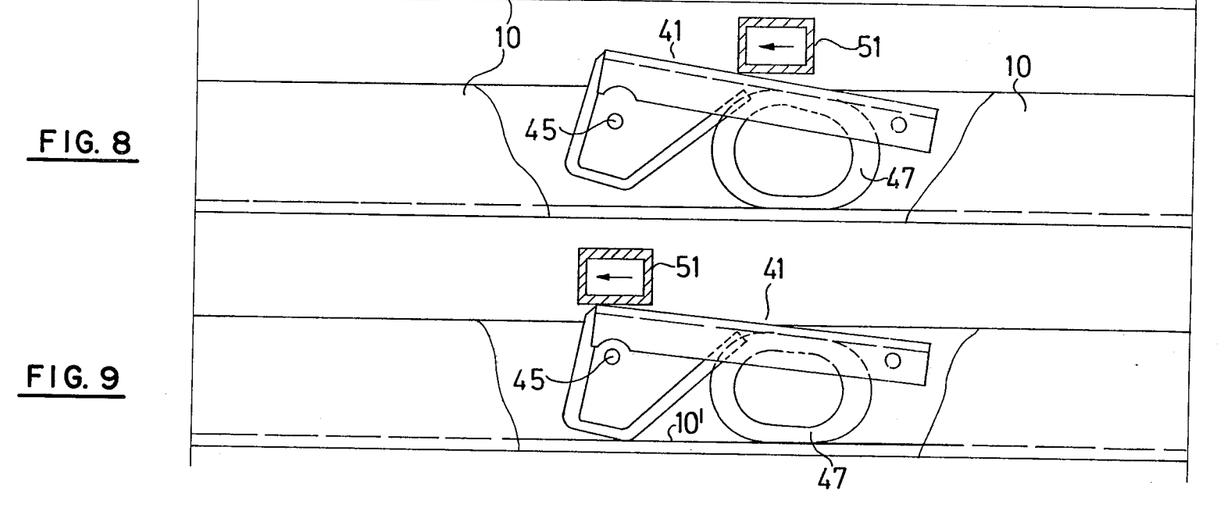

Phase 1 (FIG. 7)

The entrainment means 41 is in its upward-rotated operating position where it is being held, or being forced, against the stop 45 by the restoring device 47. The traverse 51 of a carriage 2 is approaching.

Phase 2 (FIG. 8)

The traverse 51 has reached the entrainment means 41 and is beginning to force the latter down against the action of the restoring device 47.

Phase 3 (FIG. 9)

The entrainment means 41 is pressed right down by the traverse 51 and the restoring device 57 has its maximum deformation.

Figure 10:
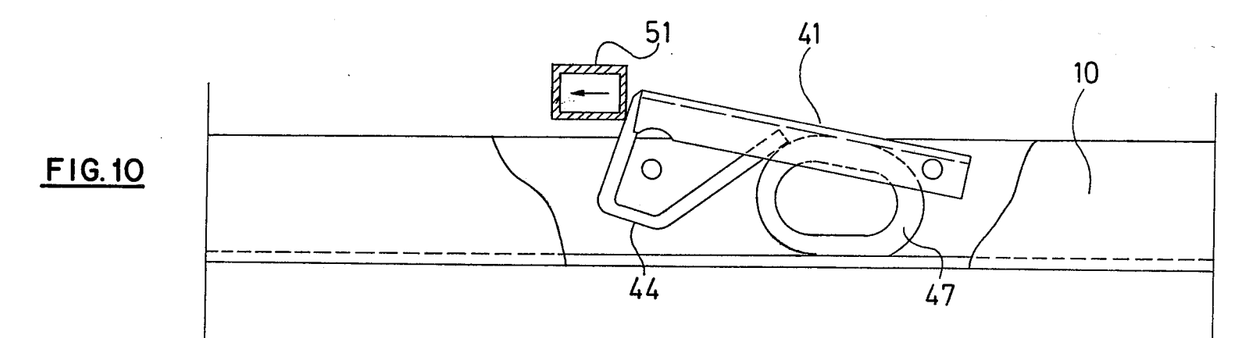

Phase 4 (FIG. 10)

The traverse 51 of the carriage 2 begins to move away and the entrainment means 41 is being forced upwards by the restoring device 47.

Figure 11:
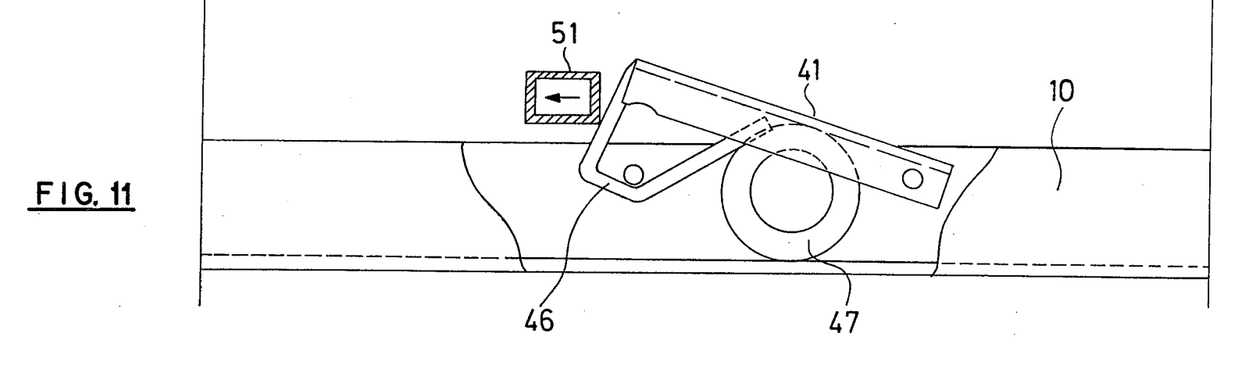

Phase 5 (FIG. 11)

The traverse 51 has just left the operating region of the entrainment means 41, which is forced completely upwards by the restoring device 47.

There are two different situations which may occur, namely:

1. An entrainment device 41 is passed over at a comparatively high speed by the traverse 51 of a carriage 2. Energy is withdrawn from the carriage by the meeting of the traverse with the lever 42 and the subsequent deformation of the restoring device 47, so that the carriage slows down (Phases 1–3). Owing to the low natural frequency and high self damping of the material used for the restoring device 47, the entrainment device 41 returns comparatively slowly so that the carriage will already have passed the entire region of the entrainment device by the time the latter has returned to its operating position (Phase 5). This means however, that Phase 4 does not occur. The same process is repeated at each of the numerous entrainment devices which the carriage passes over until the latter either comes to a stop, by itself or by coming into contact with the stop 28.

2. An entrainment device 41 is passed over a comparatively slow speed by the traverse 51 of a wheeled carriage 2. By reason of its contact with the lever 42 and the subsequent deformation of the restoring device 47 energy is withdrawn from the carriage (Phase 1–3). However, some of this energy, which is stored in the restoring device 47, is immediately returned to the wheeled carriage, inasmuch as the entrainment device 41, returning to its operating position, slides with its contact face 44 along a back edge of the traverse 51 of the wheeled carriage and accelerates it again (Phase 4). Not all of the withdrawn energy, of course, is returned to it, so that slowly moving carriage will come to a stop after it has run over a few entrainment devices 41. It is then set in motion again by the next impulse from the push rod 10 and the described process starts over again, until even the slowest wheeled carriage will have reached the end of the shelf compartment.

In the manner described, control of the speed of the carriages is achieved without requiring the use of expensive, supplementary equipment.

What I claim is:

1. A continuous storage shelf unit, comprising:
   an inclined rail track having a loading end and an unloading end;
   means for loading and unloading said shelf;
   a plurality of wheeled carriages mounted for movement along said rail track;
   momentum imparting means mounted for longitudinal movement relative to said rail track for engaging said carriages and initiating movement of said carriage along said track and comprising:

a push rod mounted centrally of said rail track for longitudinal movement relative thereto;

entrainment means for engaging said carriages and for regulating the speed of said carriages, comprising a plurality of levers having at least a single lever arm pivotally mounted on said push rod and a plurality of elastically yielding restoring devices with low natural frequency and high self damping for urging said levers into operating positions extending into the path of said carriages, at least one of said levers engaging said carriages upon motion of said push rod, at least one of said restoring devices urging at least one of said levers to engage a slowly moving carriage and to impart energy thereto, said restoring devices each comprising a hollow cylindrical resilient body located between one of said levers and said push rod;

said rail track having a downward incline in the direction of its unloading end such that the acceleration of said carriages resulting from said incline is less than the deceleration caused by rolling friction between said carriages and rail track to normally prevent movement of said carriages along said rail track and to decelerate said carriages after movement is imparted thereto, whereby momentum is imparted to said carriages by said push rod and said levers, and whereby said restoring devices and said levers are capable of withdrawing energy from, and imparting energy to, a moving carriage.

2. A continuous shelf storage unit according to claim 1, which includes a spring for normally biasing said push rod to a terminal position toward said unloading end of said rail track.

3. A continuous shelf storage unit according to claim 1, wherein said plurality of levers pivotally mounted on said push rod are capable of movement from said operating position extending into the path of said carriages to an inoperative position outside of the path.

4. A continuous shelf storage unit according to claim 3, wherein each entrainment means comprises an eccentrically mounted, two-armed lever, one arm of which being supported against said push rod with its other arm extending into the path of said carriages.

5. A continuous shelf storage unit according to claim 1, wherein said entrainment means comprises a plurality of single armed levers.

6. A continuous shelf storage unit according to claim 5, wherein each lever includes a free end provided with a contact face at an angle of approximately 90° relative to said lever for engaging said carriages.

7. A continuous shelf storage unit according to claim 5, wherein each hollow cylindrical body comprises butyl rubber.

8. A continuous shelf storage unit according to claim 1, which includes a plurality of stops on said push rod for limiting upward movement of said levers relative to said push rod.

* * * * *